US012664129B2

(12) United States Patent
Conley et al.

(10) Patent No.: US 12,664,129 B2
(45) Date of Patent: Jun. 23, 2026

(54) APPLYING RULES TO CLIENT UPDATES ON SHARED RECORDS TO TRIGGER SYSTEM-GENERATED UPDATES

(71) Applicant: Oracle International Corporation, Redwood Shores, CA (US)

(72) Inventors: Dylan Conley, Highland Park, IL (US); Peter Bull, Redwood Shores, CA (US); Jeffrey Charles Wilkins, Palatine, IL (US); Kirk Warren Rasmussen, Buffalo Grove, IL (US); Joseph Arthur Campbell, Wheeling, IL (US); Joshua Edward Thorson, Chicago, IL (US)

(73) Assignee: Oracle International Corporation, Redwood Shores, CA (US)

( * ) Notice: Subject to any disclaimer, the term of this patent is extended or adjusted under 35 U.S.C. 154(b) by 1012 days.

(21) Appl. No.: 16/836,829

(22) Filed: Mar. 31, 2020

(65) Prior Publication Data

US 2021/0081365 A1     Mar. 18, 2021

Related U.S. Application Data

(60) Provisional application No. 62/901,155, filed on Sep. 16, 2019.

(51) Int. Cl.
*G06F 16/176*          (2019.01)
*G06F 16/17*          (2019.01)
(Continued)

(52) U.S. Cl.
CPC ........ *G06F 16/176* (2019.01); *G06F 16/1734* (2019.01); *G06F 16/182* (2019.01); *G06F 16/1873* (2019.01); *G06F 21/6218* (2013.01)

(58) Field of Classification Search
CPC .. G06F 16/176; G06F 16/182; G06F 16/1873; G06F 16/1734
See application file for complete search history.

(56) References Cited

U.S. PATENT DOCUMENTS

2002/0161745 A1* 10/2002 Call .......................... A61L 2/10
2009/0089337 A1* 4/2009 Perlin ................. G06F 16/1734
(Continued)

FOREIGN PATENT DOCUMENTS

CN          101454774 A      6/2009
CN          109658215 A      4/2019
(Continued)

OTHER PUBLICATIONS

Chengzheng Sun, "OTFAQ: Operational Transformation Frequently Asked Questions and Answers", available online at <https://www3.ntu.edu.sg/home/czsun/projects/otfaq/>, 2015, 46 pages.
(Continued)

*Primary Examiner* — Van H Oberly
(74) *Attorney, Agent, or Firm* — Invoke

(57) ABSTRACT

Techniques for managing shared data records for multiple clients that have simultaneous access and editing privileges to the shared data records are disclosed. When a change is made to a shared data record, this change should be pushed out to all clients currently accessing the shared data record so that the individual clients are provided a current version of the shared data record. However, some rules may be applied to the updated data record prior to being pushed out to each client, which may result in additional changes. Therefore, in response to such requested rules-based changes, an updated shared data record is provided to each of the clients which have access to the shared data record. The shared data record may be updated in response to a change request from one of the clients, rules being applied
(Continued)

to the shared data record, or some other trigger which causes the update.

25 Claims, 7 Drawing Sheets

(51) Int. Cl.
G06F 16/18 (2019.01)
G06F 16/182 (2019.01)
G06F 21/62 (2013.01)

(56) References Cited

U.S. PATENT DOCUMENTS

| | | | |
|---|---|---|---|
| 2010/0251010 A1* | 9/2010 | Peters ................... | G06F 3/0608 |
| | | | 707/610 |
| 2012/0239886 A1* | 9/2012 | Rantanen .............. | G06F 16/273 |
| | | | 711/147 |
| 2013/0262975 A1 | 10/2013 | Rochelle et al. | |
| 2014/0358876 A1* | 12/2014 | Bhattacharjee ..... | G06F 16/1873 |
| | | | 707/695 |
| 2015/0142737 A1* | 5/2015 | Behuria ................ | G06F 16/273 |
| | | | 707/613 |
| 2015/0199317 A1 | 7/2015 | Lemonik et al. | |
| 2016/0072886 A1* | 3/2016 | Lin ...................... | H04L 67/1063 |
| | | | 709/213 |
| 2017/0134495 A1* | 5/2017 | Jang ...................... | G06F 40/166 |
| 2018/0032412 A1* | 2/2018 | Zhou ..................... | G06F 11/203 |
| 2018/0081904 A1* | 3/2018 | Cosby ................... | G06F 16/248 |
| 2018/0307717 A1* | 10/2018 | Moysi ..................... | H04L 67/56 |
| 2019/0012356 A1 | 1/2019 | Colgrove et al. | |
| 2020/0004854 A1* | 1/2020 | Inturi .................. | G06F 16/2379 |
| 2020/0026787 A1* | 1/2020 | Alam .................. | G06F 16/2379 |
| 2020/0311038 A1* | 10/2020 | Zhang ................ | G06F 16/1865 |

FOREIGN PATENT DOCUMENTS

| | | |
|---|---|---|
| JP | 2006-344012 A | 12/2006 |
| WO | 2009/158108 A2 | 12/2009 |

OTHER PUBLICATIONS

Neil Fraser, "Differential Synchronization", available online at <https://neil.fraser.name/writing/sync/>, Jan. 2009, 10 pages.
Wei et al., "Methods for rapid summation in Excel", Jul. 29, 2019.

* cited by examiner

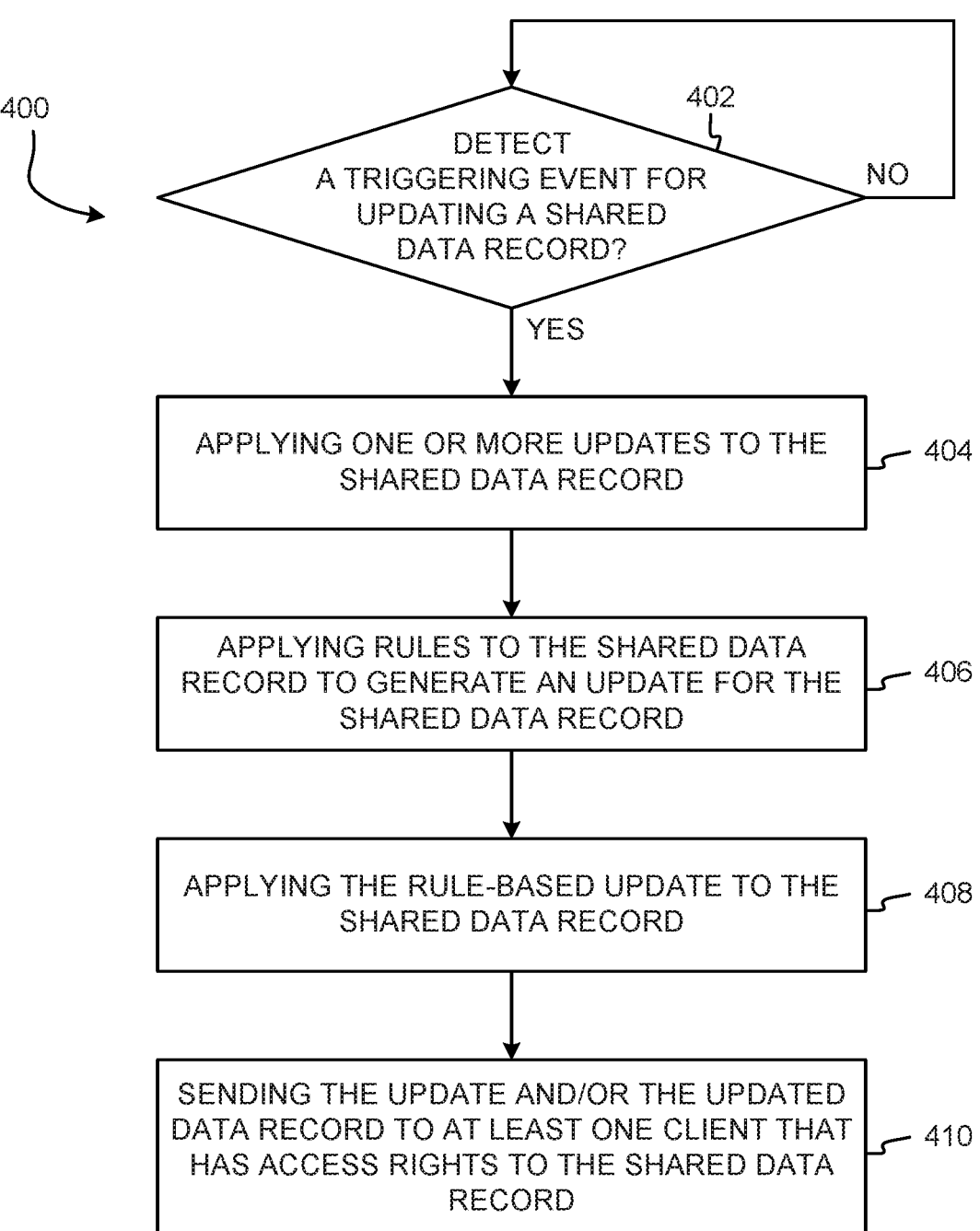

400

402

DETECT
A TRIGGERING EVENT FOR
UPDATING A SHARED
DATA RECORD?

NO

YES

APPLYING ONE OR MORE UPDATES TO THE
SHARED DATA RECORD — 404

APPLYING RULES TO THE SHARED DATA
RECORD TO GENERATE AN UPDATE FOR THE
SHARED DATA RECORD — 406

APPLYING THE RULE-BASED UPDATE TO THE
SHARED DATA RECORD — 408

SENDING THE UPDATE AND/OR THE UPDATED
DATA RECORD TO AT LEAST ONE CLIENT THAT
HAS ACCESS RIGHTS TO THE SHARED DATA
RECORD — 410

FIG. 4

APPLYING RULES TO CLIENT UPDATES ON SHARED RECORDS TO TRIGGER SYSTEM-GENERATED UPDATES

BENEFIT CLAIMS; RELATED APPLICATIONS; INCORPORATION BY REFERENCE

This application claims the benefit of U.S. Provisional Patent Application 62/901,155, filed Sep. 16, 2019, which is hereby incorporated by reference.

TECHNICAL FIELD

The present disclosure relates to a recording and displaying changes in a single record based on multiple user inputs. In particular, the present disclosure relates to applying rules to collated changes from multiple users to a shared record to trigger system-generated updates to the shared record.

BACKGROUND

To allow more than one user to share and modify a document or data record, software providers typically rely on one of three approaches to data record editing control. The first approach utilizes a locking restriction in which one user locks the data record to allow the user to perform edits on the data record, while all other users must wait in queue for their individual turns to apply their desired changes. The changes are necessarily applied in a sequential fashion due to only a single user being able to edit the data record at any one given time.

The second approach utilizes a check-out and check-in restriction in which manual conflict resolution is performed prior to merging any conflicting changes to the data record. A third approach, which is typically used for simple document collaboration, utilizes data transformation to synchronize views of the data record.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example method for providing an update to a shared data record based on detection of a trigger in accordance with one or more embodiments;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
   2.1 DATA RECORD MANAGEMENT SERVER
   2.2 COLLABORATIVE DATA RECORD MANAGEMENT ACROSS MULTIPLE CLIENTS
3. COLLABORATIVE DATA RECORD MANAGEMENT OF A SHARED DATA RECORD
   3.1 RECEIVING UPDATE/CHANGE REQUESTS
   3.2 RESOLVING PENDING CHANGES
   3.3 CONSOLIDATING CHANGES
   3.4 APPLYING SPECIFIC RULES TO THE SHARED DATA RECORD
   3.5 RELAYING UPDATES TO SPECIFIC CLIENTS ACCESSING THE SHARED DATA RECORD
4. EXAMPLE EMBODIMENTS
   4.1 PROVIDING AN UPDATE SHARED DATA RECORDS BASED ON AN UPDATE REQUEST
   4.2 PROVIDING DIFFERENCES TO UPDATE A SHARED DATA RECORD BASED ON A CHANGE REQUEST
5. COMPUTER NETWORKS AND CLOUD NETWORKS
6. MISCELLANEOUS; EXTENSIONS
7. HARDWARE OVERVIEW

1. General Overview

One or more embodiments determine and apply system-generated updates to a shared record accessible by each of a set of clients. The system determines updates for a shared record that (a) have not been requested by any of the set of clients that can access the shared record and (b) are triggered by application of rules to at least one client-requested update. The system may apply the rules to a revised record which incorporates the client-requested update. Alternatively or additionally, the system may apply the rules to a standalone version of a client-requested update. The system distributes a final revised record, to one or more of the set of clients, that incorporates both the client-requested update(s) and the system-generated update(s). The final revised record may further incorporate pending changes stored in a common ledger. Distribution of the final revised record to a client may include distribution of a set of differences from a version of the shared record accessible to the client. Alternatively, or in addition, distribution of the final revised record may include distribution of the final revised record in its entirety.

One or more embodiments described in this Specification and/or recited in the claims may not be included in this General Overview section.

2. System Architecture

2.1 Data Record Management Server

Figure 1:
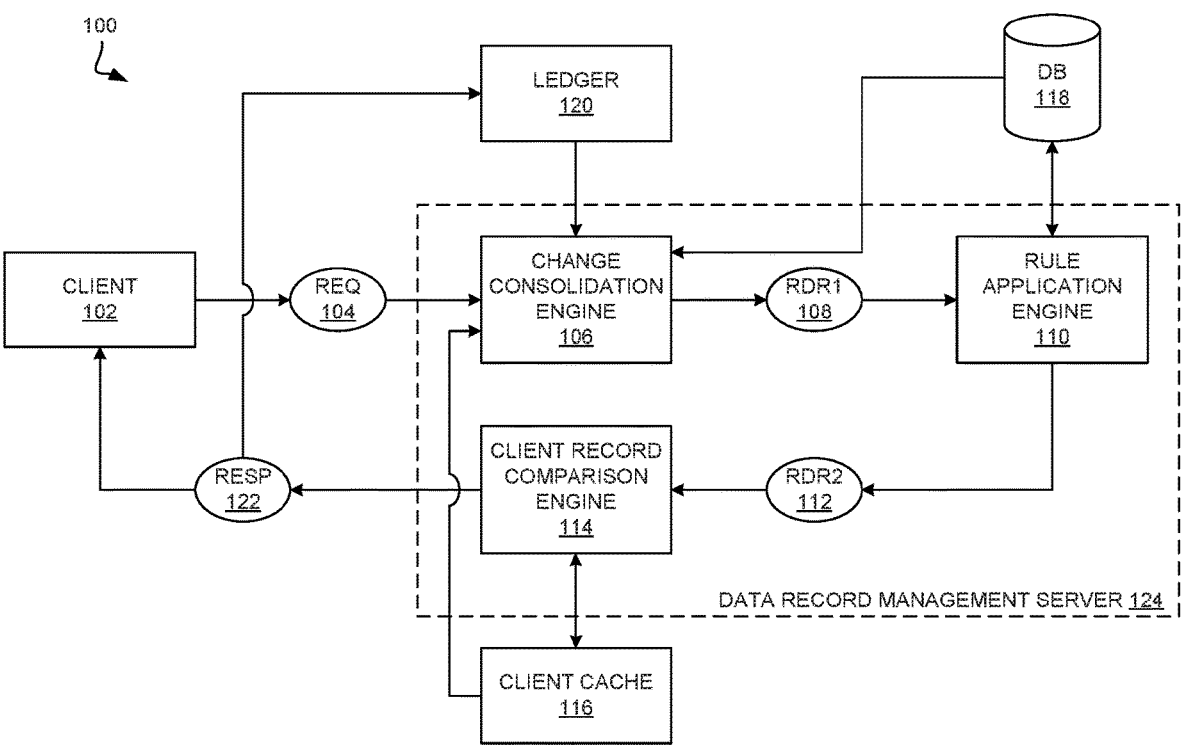
FIG. 1 illustrates a collaborative data management system in accordance with one or more embodiments.

FIG. 1 illustrates a system 100 in accordance with one or more embodiments. As illustrated in FIG. 1, system 100 includes a client 102 in communication with a data record management server 124. Data record management server 124 includes a number of components, including a change consolidation engine 106 and a client record comparison engine 114. Data record management server 124 is also configured to communicate with a data repository (DB) 118 stored to a computer readable storage medium, a common ledger 120, and a client cache 116. Any of these components may be incorporated into data record management server 124 or separate components within system 100, in various approaches. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications, devices, and/or machines. Multiple components may be combined into one application, device, and/or machine. Operations described with respect to one component may instead be performed by another component or shared across multiple components.

Additional embodiments and/or examples relating to computer networks which may be used to communicate between various components of FIG. 1 are described below in Section 5. Computer Networks and Cloud Networks.

In one or more embodiments, data repository 118 may be any type of storage unit and/or device (e.g., a file system, database, collection of tables, or any other storage mechanism) for storing data. Further, data repository 118 may include multiple different storage units and/or devices. The multiple different storage units and/or devices may or may not be of the same type or located at the same physical site. Further, data repository 118 may be implemented or may execute on the same computing system as data record management server 124 or client 102. Alternatively or additionally, data repository 118 may be implemented or executed on a computing system separate from data record management server 124 or client 102. Data repository 118 may be communicatively coupled to data record management server 124 and/or client 102 via a direct connection, via a wireless connection, via a network, or some other connection that would be apparent to one of ordinary skill in the art.

In one or more embodiments, common ledger 120 is configured to store discrete entries for each change and/or update made to a shared data record managed by data record management server 124. Common ledger 120 may store unresolved changes to the shared data record (changes and/or updates that have not yet been reflected to a version of the shared data record being viewed by client 102). In one implementation, common ledger 120 stores a log of changes made to a particular shared data record by each particular client having access to the particular shared data record managed by data record management server 124.

In an embodiment, common ledger 120 may be stored to any type of computer readable storage media and/or storage device, e.g., hard disk drive, optical disk drive, Flash memory, non-volatile random access memory (NVRAM), parameter random access memory (PRAM), or any other storage medium known in the art. Further, in an approach, common ledger 120 may have any format, data structure, or hierarchical arrangement as would be known by one of ordinary skill in the art. Common ledger 120 may or may not be located at the same physical site(s) as data record management server 124, client cache 116, data repository 118, or client 102.

In an approach, common ledger 120 may be implemented or stored on the same computing system as data record management server 124 or client 102. Alternatively or additionally, common ledger 120 may be implemented or stored on a computing system separate and/or remote from data record management server 124 or client 102. Common ledger 120 may be communicatively coupled to data record management server 124 via a direct connection, via a wireless connection, via a network, or some other connection that would be apparent to one of ordinary skill in the art.

In one or more embodiments, client cache 116 is configured to at least store differences between each shared data record managed by data record management server 124 and versions thereof that are accessed by client 102 and any other clients in communication with data record management server 124.

In an embodiment, client cache 116 may store unresolved updates and/or changes to shared data records accessible to client 102. In this embodiment, client cache 116 stores a merged view of all updates/changes made to each shared data record accessible to client 102 along with an indication of a current version of each of the shared data records being accessed by client 102.

In a further embodiment, client cache 116 may be a global cache that stores unresolved updates and/or changes to all shared data records managed by data record management server 124 accessible to a plurality of clients, including client 102. In this embodiment, client cache 116 stores a merged view of all updates/changes made to each shared data record accessible to the plurality of clients along with an indication of a current version of each of the shared data records being accessed by each of the plurality of clients.

In one or more embodiments, client cache 116 may be stored to any type of computer readable storage media and/or storage device, e.g., hard disk drive, optical disk drive, Flash memory, NVRAM, PRAM, or any other storage medium known in the art. Further, in an approach, client cache 116 may have any format, data structure, or hierarchical arrangement as would be known by one of ordinary skill in the art. Client cache 116 may or may not be located at the same physical site(s) as data record management server 124, common ledger 120, data repository 118, or client 102.

In an approach, client cache 116 may be implemented or stored on the same computing system as data record management server 124 or client 102. Alternatively or additionally, client cache 116 may be implemented or stored on a computing system separate and/or remote from data record management server 124 or client 102. Client cache 116 may be communicatively coupled to data record management server 124 via a direct connection, via a wireless connection, via a network, or some other connection that would be apparent to one of ordinary skill in the art.

In an embodiment, data record management server 124 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device. In an alternate embodiment, data record management server 124 may be partially or completely implemented as a software component operating within a hardware environment.

In one embodiment, client 102 is implemented on one or more digital devices, as described above. In an alternate embodiment, client 102 may be partially or completely implemented as a software component executing within a hardware environment.

In various examples, client 102 may be a desktop computer, laptop computer, tablet computer, smartphone, server, client device dedicated to operating with data record management server 124, or some other hardware device capable of communicating with the data record management server 124.

In one or more embodiments, an interface may be implemented in hardware and/or software to facilitate communications between client 102 and data record management server 124. Interface may render user interface elements and receive input via the user interface elements. Examples of interfaces include a graphical user interface (GUI), a command line interface (CLI), a haptic interface, a voice command interface, etc. Examples of user interface elements include checkboxes, radio buttons, dropdown lists, list boxes, buttons, toggles, text fields, date and time selectors, command lines, sliders, pages, and forms.

In an embodiment, different components of an interface may be specified in different languages. The behavior of each user interface element may be specified in a dynamic programming language, such as JavaScript. The content of user interface elements may be specified in a markup language, such as hypertext markup language (HTML), eXtensible Markup Language (XML), XML User Interface Language (XUL), etc. Moreover, a layout of user interface elements may be specified in a style sheet language, such as Cascading Style Sheets (CSS). Alternatively, an interface may be specified in one or more other languages, such as Java, C, C++, etc.

In an embodiment, client 102 sends a request ("REQ") 104 to data record management server 124. In one approach, request 104 may be a change request that includes one or more updates or changes to apply to a particular shared data record stored to data repository 118 and managed by data record management server 124. In another approach, request 104 may be an update request configured to trigger data record management server 124 to respond with an updated version of the shared data record.

According to another embodiment, data record management server 124 may perform functions described herein without a request 104 being sent from client 102, such as according to a predetermined schedule, in response to a triggering event (such as another client requesting an update/changes to the shared data record, startup of a device, changes to a network, etc.), periodically, etc.

Data record management server 124 directs request 104 to change consolidation engine 106 in response to receiving request 104. Change consolidation engine 106 may be implemented in hardware and/or software, and is configured to perform certain functions and/or logic in response to a triggering event, such as receiving request 104. Moreover, change consolidation engine 106 is configured to communicate with client cache 116, common ledger 120, and data repository 118.

In an embodiment, change consolidation engine 106 determines a first set of differences between a version of the shared data record accessed by client 102 and any changes indicated in request 104. In an approach, the first set of differences may be included in request 104. The differences may effect any portion or all of the shared data record, and may include any type of modification, deletion, addition, and/or adjustment to the shared data record, as would be understood by one of ordinary skill in the art.

In one embodiment, change consolidation engine 106 consolidates any requested update and/or changes from the request 104 with any updates and/or changes that have not been applied to the shared data record requested by other sources or triggered by one or more events. The sources may include, but are not limited to, common ledger 120 and client cache 116.

These updates and/or changes that have not been applied to the shared data record are referred to as pending updates. All of these pending updates are consolidated together with any requested update and/or changes from the request 104 in an intelligent way to create a consolidated update for the shared data record which, when applied to the shared data record, will cause the shared data record to cumulatively reflect all of the pending and requested updates and/or changes and bring the shared data record up-to-date.

In one approach, change consolidation engine 106 may simplify the pending updates and the requested update and/or changes from the request 104 prior to generating the consolidated update, as described in more detail later.

Change consolidation engine 106 applies the consolidated update to the version of the shared data record accessed by client 102 to produce a first revised data record ("RDR1") 108. In an approach, this version of the shared data record reflects all pending updates and any requested update and/or changes from the request 104 as a full and complete data record. Once the first revised data record 108 is produced, change consolidation engine 106 sends the first revised data record 108 to rule application engine 110 for further processing.

In an alternate approach, change consolidation engine 106 may send only differences between the first revised data record 108 and the version of the shared data record accessed by client 102, to reduce resource usage in transferring data.

Rule application engine 110 may be implemented in hardware and/or software, and is configured to perform certain functions and/or logic in response to a triggering event, such as receiving the first revised data record 108, differences between the first revised data record 108 and the version of the shared data record accessed by client 102, etc. Moreover, rule application engine 110 is configured to communicate with a client record comparison engine 114 and data repository 118.

Rule application engine 110 is configured to apply a set of rules (which may include one or more rules, conditions, equivalencies, equations, operations, processes, etc.) to the first revised data record 108 to determine a second update for the shared data record. This second update is predicated on any changes to the version of the shared data record accessed by client 102 to account for such changes to the underling original shared data record. In other words, the second update is required as a result of applying the first update. In addition, the second update is not requested to be applied by client 102 or any other client that has access to the shared data record. Instead, rule application engine 110 determines whether the first revised data record 108 adheres to the set of rules, and if it does not, rule application engine 110 generates the second update that, when applied to the first revised data record 108, will cause the first revised data record 108 to adhere to the set of rules.

The set of rules may include any operation for checking the first revised data record 108, manipulating and/or changing the first revised data record 108, undoing or rolling back changes to the first revised data record 108, etc. Some example operations include, but are not limited to: determining viability of a requested configuration, calculating pricing, calculating inventory, configuring a product, determining a quote of a configured product based on a plurality of pricing calculations, etc.

Once the set of rules are applied to the first revised data record 108, when deemed appropriate, a second update for the shared data record is generated to correct any deficiencies, errors, mistakes, etc., that may have existed in the first revised data record 108 due to changes to the shared data record by client 102. This second update may not be needed when there are no changes to the first revised data record 108 due to application of the rules by rule application engine 110. In this case, rule application engine 110 will keep the first revised data record 108 unchanged and transmit it to client record comparison engine 114.

In an example, the shared data record may be a quote for a configured product, the set of rules may include pricing and quoting instructions based on a configured product, and client 102 may have reconfigured the product to remove a feature. In this example, the set of rules applied by rule application engine 110 to the first revised data record 108 may analyze the configured product (which includes indication of the removed feature) and provide a revised overall price for the configured product described by the first revised data record 108 which excludes any price or cost associated with the removed feature.

In another example, the shared data record may be a complex server rack system configuration that is specified by a customer through client 102, and the set of rules may include configuration instructions for the server rack system that ensure that the components and options specified by the shared data record are viable and interoperable with other selections. If client 102 adds hardware to the server rack, such as a top-of-rack (ToR) switch, the set of rules applied by rule application engine 110 to the first revised data record 108 may analyze the modified complex server rack system configuration (which includes the added ToR switch) to determine whether the configuration is appropriate based on the overall system requirements and other components selected. In this example, rule application engine 110 may change the particular ToR switch model selected by client 102 to a different ToR switch model that is compatible with other components previously specified in the complex server rack system configuration and revise the complex server rack system configuration to include the more appropriate ToR switch.

In one or more embodiments, rule application engine 110 may store the second update, the first revised data record 108, and/or the second revised data record 112 to data repository 118. Moreover, in order to apply rules to the shared data record when change consolidation engine 106 only sends differences to rule application engine 110 instead of a full revised data record, rule application engine 110 may access the version of the shared data record that is accessed by client 102 from data repository 118 in order to apply the first update to generate the first revised data record 108 prior to applying the set of rules thereto.

Once the second update is generated by rule application engine 110, the second update is applied to the first revised data record 108 to produce a second revised data record ("RDR2") 112. Thereafter, rule application engine 110 transmits the second revised data record 112 to client record comparison engine 114. As mentioned earlier, when no second update is deemed necessary due to application of the rules, rule application engine 110 transmits the first revised data record 108 to client record comparison engine 114.

Client record comparison engine 114 may be implemented in hardware and/or software, and is configured to perform certain functions and/or logic in response to a triggering event, such as receiving the first revised data record 108, receiving the second revised data record 112, etc. Moreover, client record comparison engine 114 is configured to communicate with client cache 116 and client 102.

In one or more embodiments, client record comparison engine 114 is configured to compare the second revised data record 112 with the version of the shared data record accessed by client 102 to determine a set of differences between the two versions of the shared data record. Once these differences are determined, in order to conserve resources, a response ("RESP") 122 indicating these differences may be sent to client 102.

Client record comparison engine 114 may access the version of the shared data record accessed by client 102 from client cache 116. Client cache 116 would have a copy stored therein due to a previous interaction with client where client 102 requested access to the shared data record, and an entry is made in client cache 102 storing or otherwise indicating this version of the shared data record for future reference.

In an embodiment, client record comparison engine 114 may store, in client cache 116, the second revised data record 112 and/or the determined differences between the second revised data record 112 and the version of the shared data record accessed by client 102 for future reference.

In another approach, the response 122 sent to client 102 may include the second revised data record 112 instead of the determined differences between the second revised data record 112 and the version of the shared data record accessed by client 102. In this approach or any other, client record comparison engine 114 may store, in client cache 116, the second revised data record 112 for future reference.

2.2 Collaborative Data Record Management Across Multiple Clients

Figure 2:
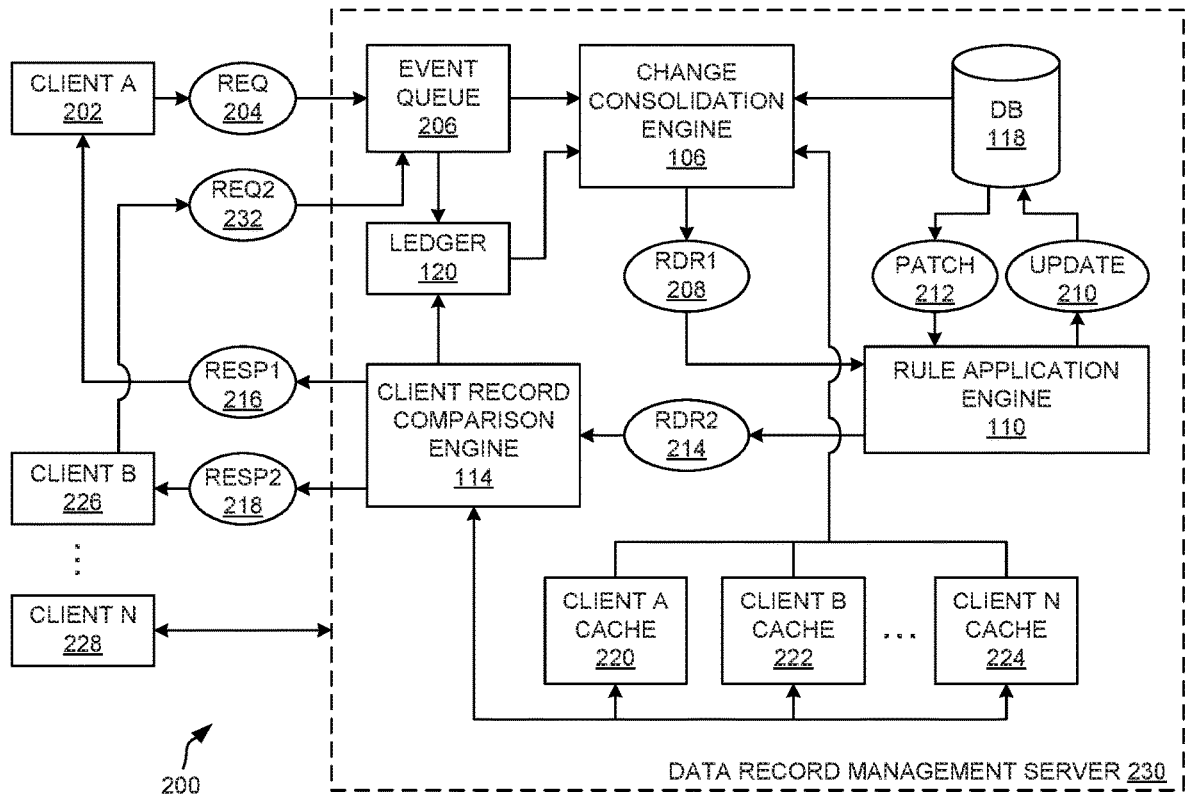
FIG. 2 illustrates another view of a collaborative data management system in accordance with the one or more embodiments.

FIG. 2 illustrates a system 200 in accordance with one or more embodiments. Components as described above in relation to FIG. 1 may be implemented in another example environment as illustrated in FIG. 2, which shows system 200 that includes a plurality of clients (client A 202, client B 226, . . . , client N 228), each client being in communication with data record management server 230. Data record management server 230 is set up similarly to data record management server 124 in FIG. 1, except that, in FIG. 2, data repository 118 and common ledger 120 are included within data record management server 230. Moreover, a plurality of client caches (client A cache 220, client B cache 222, . . . , client N cache 224) are included within data record management server 230. However, there is no requirement that these components be included in data record management server 230, and may be separate components in one or more embodiments.

Each shared data record may be simultaneously accessed by more than one of the plurality of clients, with each particular client of the plurality of clients being provided editing privileges for one or more of the shared data records hosted by the data record management server 230.

In an embodiment, each of the various client caches (e.g., client A cache 220, client B cache 222, . . . , client N cache 224) may at least store, for each client individually, differences between shared data records managed by data record management server 230 and versions thereof that are accessed by the particular clients (e.g., client A 202, client B 226, . . . , client N 228).

In this embodiment, each client cache may store unresolved updates and/or changes to shared data records accessible to the individual client to which the cache is designated (e.g., client A cache 220 stores unresolved updates and/or changes for client A 202). In this embodiment, client A cache 220 stores a merged view of all updates/changes made to each shared data record accessible to client A 202 along with an indication of a current version of each of the shared data records being accessed by client A 202.

In an alternate embodiment, a single global client cache may provide the functionality of the various client caches shown in FIG. 2.

In one or more embodiments, each of the client caches may be stored to any type of computer readable storage media and/or storage device, e.g., hard disk drive, optical disk drive, Flash memory, NVRAM, PRAM, or any other storage medium known in the art. Further, in an approach, the client caches may have any format, data structure, or hierarchical arrangement as would be known by one of ordinary skill in the art.

In an embodiment, one or more of the client caches (e.g., client A cache 220, client B cache 222, . . . , client N cache 224) may be located at the same physical site(s) as data record management server 230, common ledger 120, data repository 118, or the various clients (e.g., client A 202, client B 226, . . . , client N 228). Moreover, in an embodiment, one or more of the client caches (e.g., client A cache 220, client B cache 222, . . . , client N cache 224) may not be located at the same physical site(s) as data record management server 230, common ledger 120, data repository 118, or the various clients (e.g., client A 202, client B 226, . . . , client N 228).

Any of the components shown and described in FIG. 2 may be incorporated into data record management server 230 or operate as separate components within system 200, in various approaches.

In one or more embodiments, system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications, devices, and/or machines. Multiple components may be combined into one application, device, and/or machine. Operations described with respect to one component may instead be performed by another component or shared across multiple components.

Additional embodiments and/or examples relating to computer networks which may be used to communicate between various components of FIG. 2 are described below in Section 5. Computer Networks and Cloud Networks.

In an embodiment, data record management server 230 is implemented on one or more digital devices. In an alternate embodiment, data record management server 230 may be partially or completely implemented as a software component operating within a hardware environment.

In one embodiment, one or more of the plurality of clients (e.g., client A 202) may be implemented on one or more digital devices, as described above. In an alternate embodiment, client A 202 (or any other client) may be partially or completely implemented as a software component executing within a hardware environment.

In one or more embodiments, an interface may be implemented in hardware and/or software to facilitate communications between the plurality of clients and data record management server 230.

Data record management server 230 includes an event queue 206 which is configured to receive requests from the plurality of clients, store the various requests, and then deliver the requests to change consolidation engine 106 according to some predetermined scheme, such as according to a received order, e.g., first-in-first-out (FIFO), first-in-last-out (FILO), last-in-first-out (LIFO), etc., according to a priority designated within the request or determined by event queue 206, etc. Any method, technique, or scheme for determining an order for relaying the received requests may be employed within event queue 206 as would be apparent to one of ordinary skill in the art.

Event queue 206 may also send the requests from the plurality of clients to common ledger 120, in an embodiment, such that common ledger 120 can store the requests, or a portion thereof (such as differences between data records, requested update/changes, etc.), for future reference.

In one or more embodiments, event queue 206 may be stored to any type of computer readable storage media and/or storage device, e.g., hard disk drive, optical disk drive, Flash memory, NVRAM, PRAM, or any other storage medium known in the art. Further, in an approach, event queue 206 may have any format, data structure, or hierarchical arrangement as would be known by one of ordinary skill in the art.

When a client sends a change request, such as client A 202 sending change request ("REQ") 204 to data record management server 230, the request 204 is received at event queue 206. In accordance with the scheme employed by event queue 206 (or in an order of receipt absent such a scheme), the request is provided to change consolidation engine 106 for processing, as described with reference to FIG. 1.

As shown in FIG. 2, change consolidation engine 106 generates a first update and applies the first update to a version of the shared data record that is accessed by client A 202, which produces a first revised data record ("RDR1") 208 based on the update/changes requested by client A 202 in request 204. The version of the shared data record that is accessed by client A 202 may be included in request 204, retrieved from data repository 118, retrieved from client A cache 220, and/or retrieved from common ledger 120, in various approaches. Change consolidation engine 106 sends the first revised data record 208 to rule application engine 110 for further processing, as described with reference to FIG. 1.

Referring again to FIG. 2, in an alternate approach, change consolidation engine 106 may send only differences between the first revised data record 208 and the version of the shared data record accessed by client A 202 to rule application engine 110, thereby reducing resource usage in transferring data.

Rule application engine 110 is configured to apply a set of rules (which may include one or more rules, conditions, equivalencies, equations, operations, processes, etc.) to the first revised data record 208 to determine a second update 210 for the shared data record. This second update 210 is predicated on any changes to the version of the shared data record accessed by client A 202 to account for such changes to the underling original shared data record. In other words, the second update 210 is required as a result of applying the first update. In addition, the second update 210 is not requested to be applied by client A 202 or any other client of the plurality of clients (e.g., client B 226, . . . , client N 228). Instead, rule application engine 110 determines whether the first revised data record 208 adheres to the set of rules, and if it does not, rule application engine 110 generates the second update 210 that, when applied to the first revised data record 208, will cause the first revised data record 208 to adhere to the set of rules.

Once the set of rules are applied to the first revised data record 208, when deemed appropriate, a second update 210 for the shared data record is generated to update the shared data record in accordance with the rules that will act to correct any deficiencies, errors, mistakes, etc., that may have existed in the first revised data record 208 due to an update and/or changes to the shared data record by client A 202. This second update 210 may not be needed when there are no changes to the first revised data record 208 due to application of the rules by rule application engine 110. In this case, rule application engine 110 will keep the first revised data record 208 unchanged and transmit it to client record comparison engine 114 instead of a second revised data record 214.

Once the second update is generated by rule application engine 110, the second update 210 is applied to the first revised data record 208 to produce a second revised data record ("RDR2") 214.

Rule application engine 110 may also be configured to store the second update 210 to data repository 118 for future reference. In more approaches, rule application engine 110 may store the first revised data record 208 and/or the second revised data record 214, in place of or in addition to the second update 210.

In cases where a client requests an update to a shared data record, but has not provided any changes, or an event triggers an update to the shared data record (such as an update being requested by another client) rule application engine 110 is configured to pull an up-to-date version of the shared data record ("PATCH") 212 (or an indication of how to create the up-to-date version, e.g., the second update 210) from data repository 118 in order to provide such data record to the requesting client.

Rule application engine 110 is also configured to transmit the second revised data record 214 to client record comparison engine 114. As mentioned earlier, when no second update 210 is deemed necessary due to application of the rules, rule application engine 110 transmits the first revised data record 208 to client record comparison engine 114.

In one or more embodiments, client record comparison engine 114 is configured to compare the second revised data record 214 with the version of the shared data record accessed by client A 202 to determine a set of differences between the two versions of the shared data record. Once these differences are determined, in order to conserve resources, a first response ("RESP1") 216 indicating these differences may be sent to client A 202.

Client record comparison engine 114 may access the version of the shared data record accessed by client A 202 from client A cache 220. Client A cache 220 would have a copy stored therein due to a previous interaction with client A 202 where client A 202 requested access to the shared data record, and an entry is made in client A cache 220 storing or otherwise indicating this version of the shared data record for future reference.

In an embodiment, client record comparison engine 114 may store, in client A cache 220, the second revised data record 214 and/or the determined differences between the second revised data record 214 and the version of the shared data record accessed by client A 202 for future reference.

In another approach, the first response 216 to client A 202 may include the second revised data record 214 instead of the determined differences between the second revised data record 214 and the version of the shared data record accessed by client A 202. In this approach or any other, client record comparison engine 114 may store, in client A cache 220, the second revised data record 214 for future reference.

When processing requests from other clients, such as client B 226, change consolidation engine 106 may retrieve the version of the shared data record that is accessed by client B 226 from a request ("REQ") 232 sent by client B 226, from data repository 118, from client B cache 222, and/or from common ledger 120, in various approaches. The request 232 may be a change request, an update request, or some other type or form of a message that indicates that client B 226 is accessing a shared data record that may not be up-to-date with respect to updates/changes made by other clients.

In one or more embodiments, client record comparison engine 114 is configured to compare the second revised data record 214 with the version of the shared data record accessed by client B 226 to determine a set of differences between the two versions of the shared data record. Once these differences are determined, in order to conserve resources, a second response ("RESP2") 218 indicating these differences may be sent to client B 226.

In response to the request 232 from client B 226 for an up-to-date shared data record, client record comparison engine 114 may access a version of the shared data record accessed by client B 226 from client B cache 222. Client B cache 222 would have a copy stored therein due to a previous interaction with client B 226 where client B 226 requested access to the shared data record, and an entry is made in client B cache 222 storing or otherwise indicating this version of the shared data record for future reference. In one or more embodiments, client record comparison engine 114 may store, in client B cache 222, the second revised data record 214 and/or determined differences between the second revised data record 214 and the version of the shared data record accessed by client B 226 for future reference.

In another approach, the second response 218 to client B 226 may include the second revised data record 214 instead of the determined differences between the second revised data record 214 and the version of the shared data record accessed by client B 226. In this approach or any other, client record comparison engine 114 may store, in client B cache 222, the second revised data record 214 for future reference.

Figure 3:
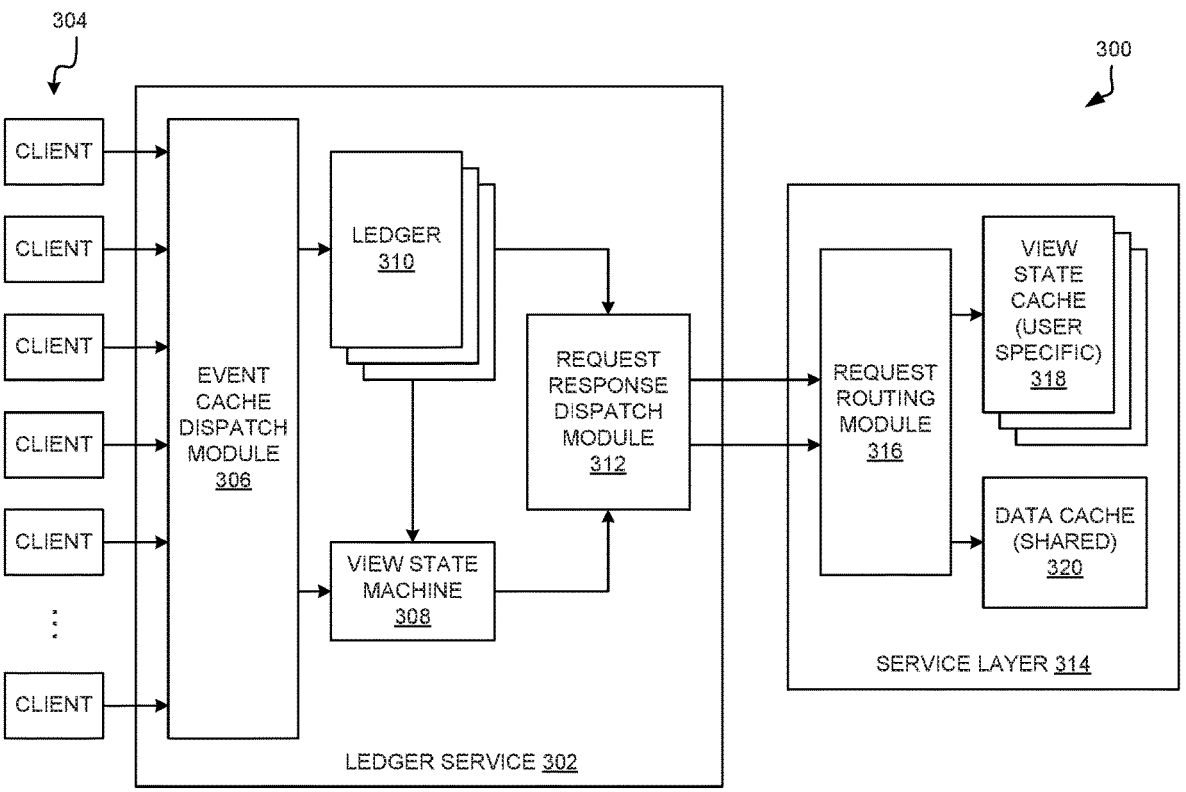
FIG. 3 illustrates functional blocks of a collaborative data management system in accordance with the one or more embodiments.

FIG. 3 illustrates functional blocks of a collaborative data record management system 300 in accordance with the one or more embodiments. A plurality of clients 304 are communicatively coupled with an event cache dispatch module 306, which acts as the front-end for a ledger service 302. Event cache dispatch module 306 is configured to receive requests from the plurality of clients 304, and intelligently dispatch such requests to one or more ledgers 310 and to a view state machine 308.

Each of the one or more ledgers 310 is configured to store unresolved update/change information for a single shared data record that is managed by collaborative data record management system 300 and able to be accessed and modified by at least one of the plurality of clients 304. In an approach, the unresolved update/change information that are stored to the various ledgers 310 include changes and/or updates that have not yet been reflected to a version of a particular shared data record being viewed/accessed by one of the plurality of clients 304.

In an embodiment, the number of ledgers 310 may approximately equal the number of data records that are shared across the plurality of clients 304. In one or more embodiments, a ledger 310 may be created upon receiving an update/changes to one of the shared data records, and may not exist prior to such update/changes being received and/or identified by collaborative data record management system 300. In another embodiment, a corresponding ledger may be created upon establishment of its corresponding shared data record (either due to creation or indication of sharing).

In one implementation, each of the ledgers 310 store a log of changes made to a particular shared data record by each particular client having access to the particular shared data record managed by collaborative data record management server 300.

View state machine 308 is configured to determine and maintain which portions of records and/or which entire records from the one or more shared data records that specific clients 304 are authorized to view, access, and/or edit. In other words, view state machine 308 receives information from one or more ledgers 310 and from event cache dispatch module 306, and reconciles a state of each shared data record that each client is currently accessing, to ensure that the particular clients are only being provided authorized access upon updates and changes being made to the various shared data records.

Request response dispatch module 312 receives input from ledgers 310 and the view state machine 308, in order to determine a current state of all shared data records available to each of the various clients 304. Once this information is sorted, request response dispatch module 312 forwards on the requests from the plurality of clients 304, along with any useful and/or needed information (states or current version of shared data records, access/edit privileges for different clients, updates/changes, etc.) to the service layer 314.

In the service layer 314, the information from request response dispatch module 312 is received at a request routing module 316, which is configured to determine where to send the various information, such as update/change requests from one of the plurality of clients 304. Request routing module 316 is configured to store data in a shared data cache 320 and client-specific view state caches 318. Shared data cache 320 includes rules for applying to the various shared data records, along with any other information useful for processing client requests. Each of the client-specific state caches 318 store client-specific information that tracks and logs view states for different data records, client access and editing privileges, etc.

3. Collaborative Data Record Management of a Shared Data Record

In an embodiment, each client in a collaborative data record management system may have access to a particular data record that is shared with many clients of the collaborative data record management system. This particular shared data record may be managed by a data record management server, which provides copies or instances of the particular shared data record to multiple clients simultaneously.

3.1 Receiving Update/Change Requests

In an embodiment, each client in a collaborative data record management system may request an update and/or changes be applied to the particular shared data record.

In one approach, this request may be triggered due to changes being made to the particular shared data record on a device of one of the clients, referred to as a change request. In another approach, this request may be triggered by a client opening and/or viewing a version of the particular shared data record that is not up-to-date, and this action causes the client to send what is referred to as an update request for the particular shared data record. In either case, the request is received by the data record management server, and includes information that may be used to determine a current state or version of the shared data record on whichever client the request originated from. The changes triggered by the client (and/or for the benefit of the client) may be time-based (e.g., based on an amount of time transpiring, based on a time of day occurring, based on expiration of a timer, etc.), caused by another operation, caused by actions of another client, or otherwise initiated. The data record management server may also receive any update/changes requested by the originating client, when applicable.

For example, a user may delete a field in a table that is being viewed at a specific client. The deletion of this field would then be propagated to all other instances of the table being viewed and/or accessed by other clients once the data record management server is notified of an instance being viewed/accessed at another client being out-of-date.

3.2 Resolving Pending Changes

Once the request, update, and/or changes are received at the data record management server, the data record management server determines whether any pending updates/changes exist for the particular shared data record. These pending updates/changes may be submitted by one or more other clients. When the particular shared data record is accessed by more than one client simultaneously, there is a chance that differences between the versions of the same data record will be generated at the multiple clients. Over time, these differences may become quite large, and may be very difficult to reconcile if allowed to propagate for too long.

Therefore, in an embodiment, each client that has the particular shared data record open will send an update request, even in the absence of any changes being made to the particular shared data record at the client, in order to reconcile pending updates/changes that have been made at other clients. Upon receiving the update request, the data record management server may send out a response that includes differences between the version of the particular shared data record being viewed/accessed by the client, and the up-to-date version managed by the data record management server.

In one or more embodiments, the data record management server may send out periodic messages to all clients that are currently or have previously accessed the particular shared data record. These periodic messages will be client specific, and indicate differences between the version of the particular shared data record being viewed/accessed by each individual client, and the up-to-date version managed by the data record management server.

3.3 Consolidating Changes

In one approach, change consolidation engine may simplify any pending updates and any requested update and/or changes from a request prior to generating a consolidated update. This simplification may include, but is not limited to, removing duplicative actions and/or operations, eliminating actions and/or operations that would be moot due to execution of another action and/or operation, generating an order of operations for the multiple operations needed to perform the update(s) to the shared data record, re-ordering the order of operations to reduce processing and/or resource usage in performing the update(s), etc.

In an embodiment, the order of operations may be based on a time in which the change and/or update was received, e.g., FIFO, FILO, LIFO, etc. In another embodiment, the order of operations may be based on resource usage needed to perform each of the various operations, e.g., operations which consume the least resources may be performed prior to more resource intensive operations, or vice versa. In another approach, the order of operations may be based on a determined or implicit priority of the change and/or update. In an embodiment, one or more clients may enact changes to multiple individual records in a bulk operation and/or request, with each client having its own ledger, queue of changes, map of differences-to-merge, etc. The ledgers are used to record these changes to the individual records. The server will delegate the changes between the various record queues and process the changes to the individual records accordingly.

A consolidated update is generated as an outcome of consolidating all pending updates/changes with changes indicated in a change request for a particular shared data record. Once this consolidated update is created, it may be applied to the version of the particular shared data record accessed by the client which submitted the change request, in order to apply all updates and changes indicated by this particular client and all others having editing privileges for the particular shared data record.

3.4 Applying Specific Rules to the Shared Data Record

After all requested and pending updates and/or changes are applied to the shared data record, it is passed through a rule application engine to ensure that the resulting record adheres to specific rules. The rule application engine may apply the rules to determine issues in the shared data record, and then generate an update that may be applied to the shared data record that is configured to overcome the detected issues. In this embodiment, multi-node computation is supported by establishing affinity (a link, association, etc.) between a single node and a shared record which is to be modified. Requests to change the shared record are routed to the single node which has affinity to the shared record. As a result, collaboration between multiple nodes may scale to hundreds and even thousands of concurrent users, operations, and clients, or more.

The update generated by the rule application engine may be required or necessary as a result of consolidating the pending changes and requested changes and applying them to the shared data record. In addition, the update generated by the rule application engine causes changes to the shared data record that are not requested by any client, but instead are dictated by the rules themselves and may be independent of the changes made to the shared data record.

In one approach, the rules may be directed toward determining viability of a requested configuration, calculating pricing, calculating inventory, configuring a product, and/or determining a quote of a configured product based on a plurality of pricing calculations.

The rules may be sorted into many different categories, with each category being directed toward a certain aspect of data records. For example, some categories for rules may include organization and formalities, configuration, pricing and cost, and user authorization and privileges.

The organization and formalities rules may detect and correct any issues that arise from a client making changes to a data record that would not appear to be desired. Some example changes that may have been made mistakenly or accidentally include, but are not limited to, duplicative entries, deletion of important content, mistyped or misspelled entries, inconsistent formatting, wrong language(s), etc. These types of errors may be detected and corrected by applying rules that check for common organizational and formatting issues and applying known solutions to overcome such issues.

The configuration rules may detect and correct any issues that arise from a client making changes to a data record that result in faulty, impossible, or generally unusable configurations when the shared data records are directed toward the configuration of some article, system, device, or product. Some example changes that may result in unusable configurations include, but are not limited to, specifying mismatched components (e.g., a wrong size bolt for a nut, a mobile phone battery specified for a desktop computer, etc.), specifying inadequate components for the overall system (a battery that is too weak to power a unit, a fan that is too small to move sufficient air to cool a processor, etc.), specifying incompatible components (e.g., a metric bolt with a standard nut, a DC fan in an AC power grid, etc.), etc. These types of errors may be detected and corrected by applying rules that check for common configuration issues and applying known solutions to overcome such issues.

The pricing and cost rules may detect and correct any issues that arise from a client making changes to a data record that causes a change in components (thereby increasing or decreasing a cost of the components within a configured article, system, device, or product), change in a number of components (thereby increasing or decreasing a multiple of cost factors), and/or change in number of configured articles, systems, devices, or products. This may be typical Configure-Price-Quote mechanisms and logic that allow clients to each make changes to the configuration, which is then priced and quoted based on available inventory, timing requirements, locations of components, etc., in order to generate a quote for the configured article, system, device, or product that is able to be produced at a quoted price.

The user authorization and privileges rules may detect and correct any issues that arise from changes to a data record that are not allowed based on the identity of the user making the change, a system setting which disallows certain changes, etc. Some example changes that may result in disallowance after applying the rules (e.g., the change will not be allowed to take place and the shared data record will revert to a previous version) include, but are not limited to, a user without deletion privileges making a deletion, a user without administrator privileges changing a format of a data record, a client from a first portion of an organization attempting to change a data record owned by a second portion of the organization, etc. These types of unauthorized changes may be detected and corrected by applying rules that check for common user authorization and privileges issues and applying known solutions to overcome such issues.

The rules that are applied to the shared data records after applying all pending and requested changes are not limited to the above described categories, as any conceivable type of rule, algorithm, calculation, and operation may be applied to the updated data record as desired by an architect of the rule application engine.

In an embodiment, in the event of a constrained operation, distribution of the change to other clients may be limited based on the user's record cache as a temporary holding. This methodology provides the user an opportunity to correct the scenario that lead to the constrained operation without affecting the shared record itself and other client operations invoking the shared record.

3.5 Relaying Updates to Specific Clients Accessing the Shared Data Record

While a client is accessing a particular shared data record, other clients may generate updates/changes to the particular shared data record. Furthermore, the rules applied by the rule application engine may be modified, resulting in an update being needed for the particular shared data record.

In order to maintain the consistency of the particular shared data record across all clients having access, periodic updates may be sent to each client which is actively accessing the particular shared data record, in an embodiment. In another embodiment, all clients that have access privileges to the particular shared data record may be sent a periodic update, regardless of any current activity with the particular shared data record. According to another embodiment, every client connected to the data record management server may be sent periodic updates to every shared data record managed by the data record management server.

In an embodiment, only those clients which send an update request or a change request will receive information needed to update the version of the particular shared data record being accessed by the specific client at any given time. This technique may be used in order to minimize usage of processing and transmission resources, as a result of a client or operational demand, as a default setting, or for any other reason. Because the other clients have not sent a request, it is expected that these clients are not using this particular shared data record. In addition, once the particular shared data record is opened and/or accessed on any of the clients, this action may trigger for an update request to be sent to the data record management server, thereby resulting in the particular shared data record being updated automatically.

4. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

4.1 Providing an Update to a Shared Data Record Based on a Trigger

FIG. 4 illustrates an example method 400 for providing an update to a shared data record based on detection of a trigger in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In operation 402, one or more triggering events for updating a shared data record may be detected. In response to the triggering event(s) being detected, method 400 continues to operation 404. Otherwise, method 400 continues to wait for detection of one of the triggering events in operation 402.

The triggering event(s) may correspond with and/or cause a shared data record to be updated, and may take on any suitable form, detectable condition, state, and/or prompt for initiating method 400. Some example triggering events include, but are not limited to, a client requesting an update/ changes to a shared data record, a client requesting access to the shared data record, startup of a device, shutdown and/or hibernation/sleep of a device, changes to a network, addition or removal of a device in a collaborative data record management system, receiving an update/changes to the shared data record, opening a data record, storing a data record, etc.

Detection of the triggering event(s) being satisfied may be performed by any device capable of such detection, including but not limited to, one of the clients in the collaborative data record management system, a collaborative data record management server, a common ledger, etc.

In operation 404, at least one update and/or change is applied to the shared data record as a result of detecting the triggering event(s). The update/changes may be included in a change request received from one of the clients of the collaborative data record management system, in an approach. Moreover, the update/changes may be provided by a component of the collaborative data record management system, and applied to the shared data record upon accessing the shared data record by one of the clients.

In one approach, the update/changes to the shared data record may be obtained from a common ledger. The common ledger stores a log of updates made by each particular client of the collaborative data record management system to a version of the shared data record accessed by the particular client.

In an implementation, the update/changes to the shared data record may be obtained from a client cache. The client cache stores a merged view of all updates made to the shared data record by the requesting client and indication of a current version of the shared data record being accessed by the requesting client.

In operation 406, rules specific to the collaborative data record management system are applied to the shared data record after applying the update/changes in order to generate an update for the record. This rules-based update is required and/or dictated as a result of applying the previous update/changes requested by a client, and has not been requested by any of the clients of the collaborative data record management system.

These rules may be directed toward certain types of data records, and may be particular to the previous update/changes made to the shared data record by a requesting client. Any type of business procedure, organization, formatting, pricing, cost analysis, inventory, calculations, algorithms, and/or operations may be included in the applied rules, as desired by an architect of the collaborative data record management system.

Moreover, many different sets of rules may exist, with one set of rules being applied to one type of data record (e.g., operating information logs, sensor data, production and output records, etc.), and a second set of rules being applied to a second type of data record (e.g., word processing documents, spreadsheets, etc.).

In operation 408, the rules-based update is applied to the shared data record. When application of the rules does not result in any further update to the shared data record, then no update is applied in operation 408.

In operation 410, a message is sent to at least one of the clients which has access privileges for the shared data record, with the message including the update, the updated data record, or both. The client(s) may utilize the updated data record in place of any versions which were previously being used to bring its current view of the shared data record up-to-date.

When only the update is sent, the client(s) may use the update to modify a version of the shared data record stored locally to bring it up-to-date with the latest changes made due to application of the rules.

Figure 5:
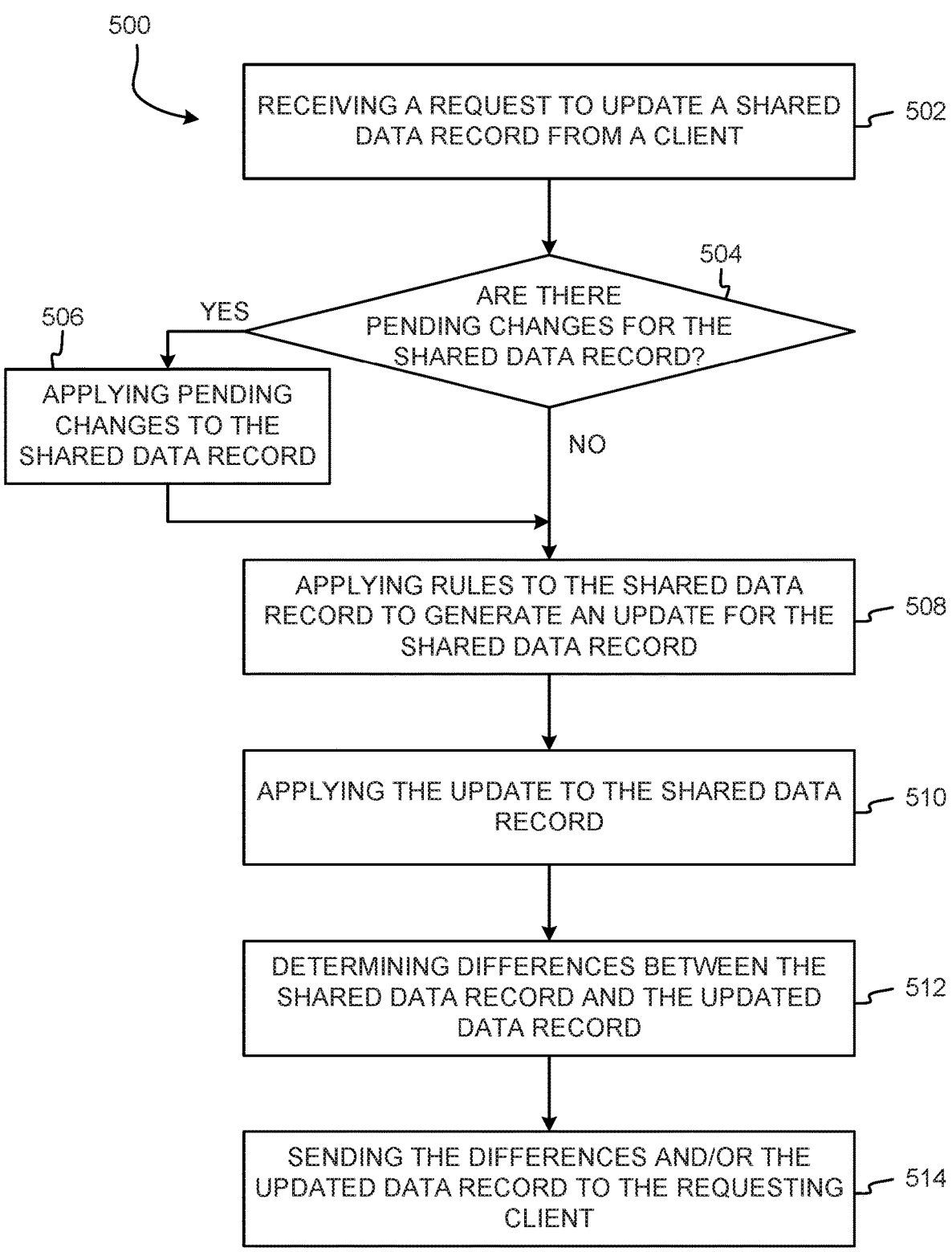
FIG. 5 illustrates an example method for providing differences for a shared data record based on receiving a request from a client, in accordance with one or more embodiments.

4.2 Providing Differences to Update a Shared Data Record Based on an Updata Request FIG. 5 illustrates an example method 500 for providing differences for a shared data record based on receiving a request from a client, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In operation 502, a request to update a shared data record is received from a client in a collaborative data record management system. The client may request an update for a shared data record, request that changes be applied to the shared data record, or request to access the shared data record. This request indicates to the collaborative data record management system that any pending changes for this shared data record should be applied thereto to update the version being accessed on the requesting client.

In operation 504, it is determined whether there are any pending changes that already exist for the shared data record. Pending changes include updates and/or changes that have been requested by other clients to the same shared data record, and may be aggregated and simplified into a single update prior to application to the shared data record.

In operation 506, the pending changes are applied to the shared data record as a result of receiving the request and determining that such pending changes exist. After generation of the update based on pending changes, the update is applied to the shared data record. However, this update may cause undesirable and/or impermissible changes to the shared data record. Therefore, in an approach in operation 508, rules are applied to the shared data record to determine if all changes are appropriate and allowable.

In one approach, the pending changes to the shared data record may be obtained from a common ledger. The common ledger stores a log of updates made by each particular client of the collaborative data record management system to a version of the shared data record accessed by the particular client.

In an implementation, the pending changes to the shared data record may be obtained from a client cache. The client cache stores a merged view of all updates made to the shared data record by the requesting client and indication of a current version of the shared data record being accessed by the requesting client.

In one implementation, the client cache may be responsible for holding changes that are staged for a particular client, but are not to be shared with other clients or stored to the common ledger. This allows for the particular client to be put into a state where errors may be managed. In this state, the particular client may rerun and/or re-execute rules, triggers, and/or logic which may possibly overcome the errors without forcing other clients (which may be accessing and/or relying on records shared with the particular client) into an invalid state.

In other words, errors in user entry are kept to the particular client via the client cache and are not shared with other users. In this way, other users are able to continue to collaborate and work freely with shared records while the particular client is in an erroneous state and may work to resolve its issues. This is important when a client comprises an API request or some other machine-initiated operation which will not have the capacity to retry or evaluate alternate routes to completing the task. The API or machine-initiated operation will complete successfully in this scenario even while another client indicates that a view of the shared records are in an invalid state which halts other operations for these shared records from such clients. It is noted that the particular client, while in the erroneous state, may continue to receive updates as other clients change and/or alter the shared record, so that the particular client is up to date once the error is cleared.

In operation 508, rules specific to the collaborative data record management system are applied to the shared data record after applying the update based on pending changes in order to generate an update for the record. This rules-based update is required and/or dictated as a result of applying the previous update/changes requested by a client, and has not been requested by any of the clients of the collaborative data record management system.

These rules may be directed toward certain types of data records, and may be particular to the previous update/changes made to the shared data record by a requesting client. Any type of business procedure, organization, formatting, pricing, cost analysis, inventory, calculations, algorithms, and/or operations may be included in the applied rules, as desired by an architect of the collaborative data record management system.

Moreover, many different sets of rules may exist, with one set of rules being applied to one type of data record (e.g., operating information logs, sensor data, production and output records, etc.), and a second set of rules being applied to a second type of data record (e.g., word processing documents, spreadsheets, etc.).

In operation 510, the rules-based update is applied to the shared data record. When application of the rules does not result in any further update to the shared data record, then no update is applied in operation 510.

In operation 512, differences between a version of the shared data record that is accessed by the requesting client and the updated data record after having the rules-based update applied are determined. By determining these differences, and storing them as a data record for use to update the version of the shared data record accessed by the requesting client, processing power and communication resources may be conserved in alerting the requesting client of the changes to the shared data record. In one approach, the differences may be sent to the common ledger for storing therein.

In operation 514, a message is sent to the requesting client, the message including the differences and/or the updated data record, or both. This message may be sent to other clients in addition to the requesting client, and when the updated data record is sent out, it may be sent to any client for updating the data record at each client. When only the differences are sent in the message, they may be sent to any client who is accessing the same version of the shared data record as the requesting client in order to maintain consistency across all clients in the collaborative data record management system and modify a version of the shared data record stored locally to bring it up-to-date with the latest changes made due to application of the rules.

The requesting client and any other clients receiving the message may utilize the updated data record in place of any versions which were previously being used to bring their current view of the shared data record up-to-date.

Figure 6:
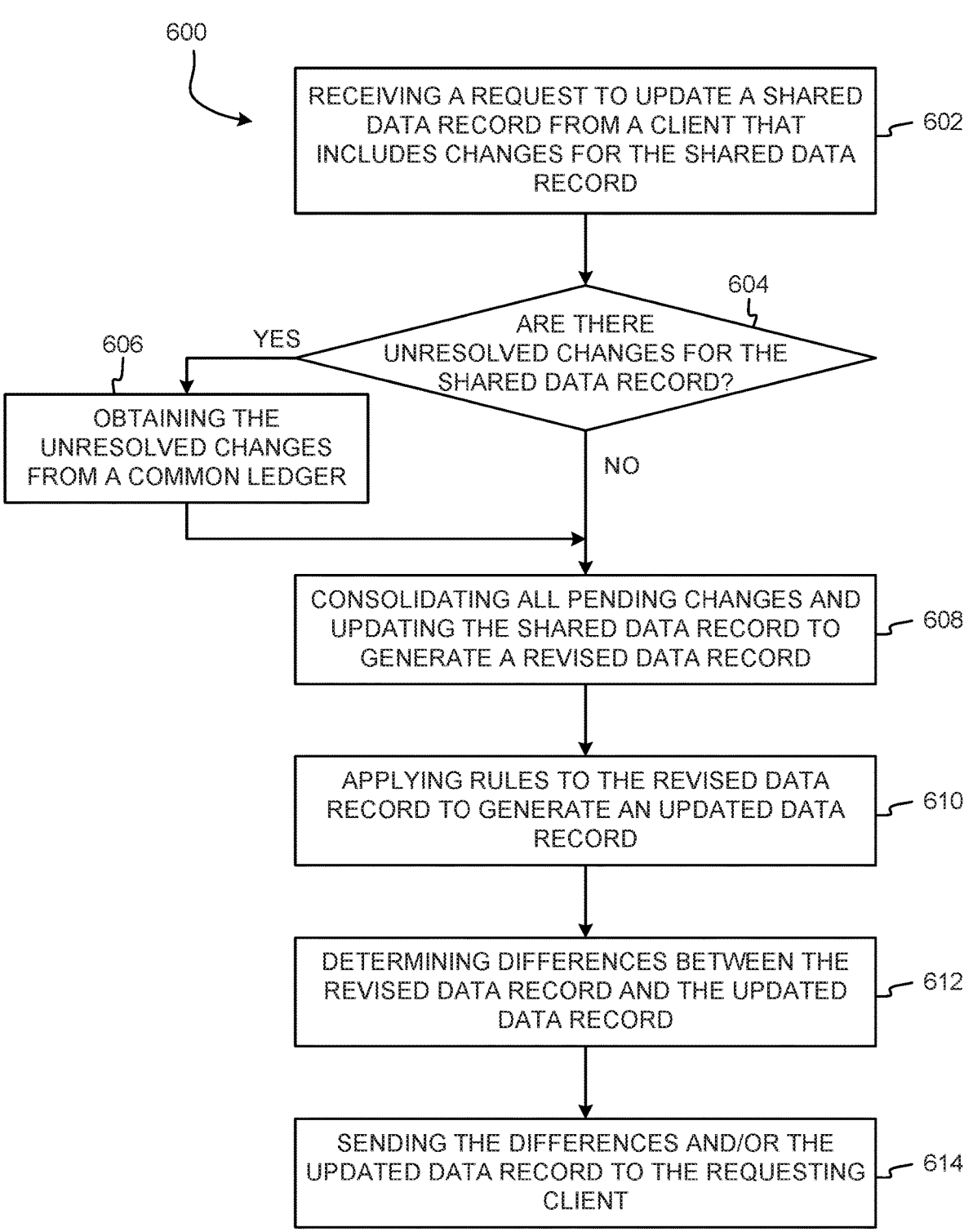
FIG. 6 illustrates an example method for providing differences for a shared data record based on receiving a change request from a client, in accordance with one or more embodiments.

4.3 Providing Differences to Update a Shared Data Record Based on a Change Request FIG. 6 illustrates an example method 600 for providing differences for a shared data record based on receiving a change request from a client, in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In operation 602, a change request to apply changes to a shared data record is received from a client in a collaborative data record management system. The client may request that changes be applied to the shared data record based on activity performed at the client or for any other reason that is able to be detected by the client.

In operation 604, a determination is made as to whether there are any unresolved changes for the shared data record. In response to finding such unresolved changes, a common ledger is accessed to obtain the unresolved changes for the shared data record in operation 606. In a further approach, unresolved changes may also be stored in a client cache specific to the requesting client, and may be obtained from this source in addition to or exclusive of the common ledger.

Otherwise, method 600 continues to operation 608, where the unresolved changes (if available) may be consolidated together along with the requested changes in the request received in operation 602. Thereafter, the consolidated changes may be simplified and/or applied in an intelligent way to reduce resource consumption and ensure consistency of changes being applied from different sources (e.g., so that text is not modified in a section which has already been deleted). Once the unresolved changes are simplified (if possible), they are applied to the shared data record to generate a revised data record in accordance with all the requested and unresolved changes.

Unresolved changes may include updates and/or changes that have been requested by other clients to the same shared data record, other changes indicated by the requesting client, modifications made as a result of applying rules, etc. The revised data record may include undesirable and/or impermissible changes to the shared data record. Therefore, in operation 610, rules are applied to the revised data record to determine if all changes are appropriate and allowable.

In operation 610, rules specific to the collaborative data record management system are applied to the revised data record to generate an updated data record. This rules-based update is required and/or dictated as a result of applying the previous unresolved changes and update/changes requested by the client, and has not been requested by any of the clients of the collaborative data record management system.

These rules may be directed toward certain types of data records, and may be particular to the previous update/changes made to the shared data record by a requesting client. Any type of business procedure, organization, formatting, pricing, cost analysis, inventory, calculations, algorithms, and/or operations may be included in the applied rules, as desired by an architect of the collaborative data record management system.

Moreover, many different sets of rules may exist, with one set of rules being applied to one type of data record (e.g., operating information logs, sensor data, production and output records, etc.), and a second set of rules being applied to a second type of data record (e.g., word processing documents, spreadsheets, etc.).

When application of the rules does not result in any further update to the revised data record, then the revised data record remains unchanged after application of the rules.

In operation 612, differences between a version of the shared data record that is accessed by the requesting client and the updated data record after having the rules-based update applied are determined. By determining these differences, and storing them as a data record for use to update the version of the shared data record accessed by the requesting client, processing power and communication resources may be conserved in alerting the requesting client of the changes to the shared data record.

In one approach, the differences may be sent to the common ledger for storing therein. The requesting client may make these updates to the common ledger directly, or via one or more intermediary devices.

In operation 614, a message is sent to the requesting client, the message including the differences and/or the updated data record, or both. This message may be sent to other clients in addition to the requesting client, and when the updated data record is sent out, it may be sent to any client for updating the data record at each client. When only the differences are sent in the message, they may be sent to any client who is accessing the same version of the shared data record as the requesting client in order to maintain consistency across all clients in the collaborative data record management system and modify a version of the shared data record stored locally to bring it up-to-date with the latest changes made due to application of the rules.

The requesting client and any other clients receiving the message may utilize the updated data record in place of any versions which were previously being used to bring their current view of the shared data record up-to-date.

In an embodiment, various different users may modify data and/or different rules may execute that affect data and a meta-state of a multitude of other related records (which may also have a hierarchical relationship). This embodiment manages any conflicts that may arise due to changes from operations on related resources by synchronizing changes to a determined set of related records.

The techniques described herein provide a deterministic output for complex, multi-part operations. Multiple clients acting on a shared, related set of data records may perform concurrent and complex operations, and the result is always deterministic. Examples of such operations include sorting a list of ordered records, evaluation of scripts that update the values of large numbers (e.g., thousands) of data attributes which have dependencies on each other and other shared data records. In other words, the resulting data state reflects the intent of the system logic (as defined in one or more rules) and the intent of the operations of each client.

Conventionally, such complex scenarios result in an unexpected output in which dependencies do not resolve and/or rules collide. This causes the final state of the document to not reflect the rules defined by the application or clients. Moreover, the final state of the document may not reflect the intent of the discrete operations performed thereon.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts" or "clients") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
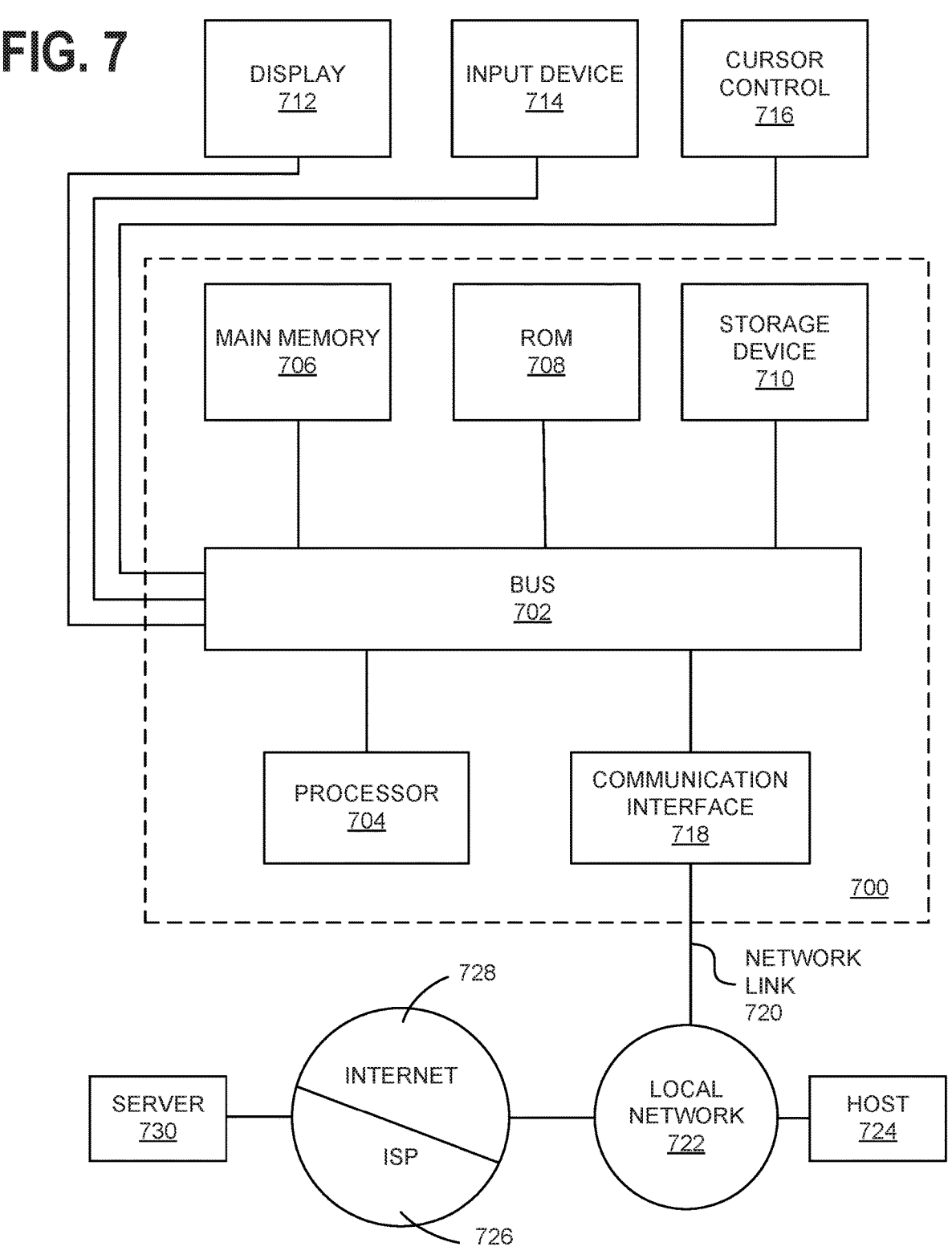
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

receiving, from a first client, a change request comprising a first update to a shared data record, the shared data record being accessible to a plurality of clients including the first client;

applying at least the first update to the shared data record to create a first revised data record;

applying one or more rules to the first revised data record to determine a second update of the shared data record that (a) is required as a result of applying the first update, and (b) has not been requested by any of the plurality of clients;

applying the second update to the first revised data record to create a second revised data record; and sending the second revised data record to the first client.

2. The medium as recited in claim 1, wherein creating the first revised data record comprises:

consolidating the first update with any unresolved updates to the shared data record submitted by at least one other client of the plurality of clients to create a consolidated update; and applying the consolidated update to the shared data record to create the first revised data record.

3. The medium as recited in claim 2, wherein the unresolved updates to the shared data record are obtained from a common ledger, wherein the common ledger stores a log of updates made by each particular client of the plurality of clients to a version of the shared data record accessed by the particular client.

4. The medium as recited in claim 2, wherein the unresolved updates to the shared data record are obtained from a client cache, wherein the client cache stores a merged view of all updates made to the shared data record by the first client and indication of a current version of the shared data record being accessed by the first client.

5. The medium as recited in claim 1, wherein applying the one or more rules comprises an action selected from a group of actions comprising: determining viability of a requested configuration, calculating pricing, calculating inventory, configuring a product, and determining a quote of a configured product based on a plurality of pricing calculations.

6. The medium as recited in claim 1, wherein the operations further comprise:

receiving an update request for the shared data record from a second client;

determining a second set of differences between the second revised data record and a second version of the shared data record accessed by the second client; and sending the second set of differences to the second client.

7. The medium as recited in claim 1, wherein the shared data record is simultaneously accessed by more than one of the plurality of clients, with each particular client of the plurality of clients being provided editing privileges for the shared data record.

8. The medium as recited in claim 1, wherein creating the first revised data record comprises applying a pending update requested by a second client of the plurality of clients.

9. The medium as recited in claim 1, wherein the shared data record is simultaneously accessed by more than one of the plurality of clients, with each particular client of the plurality of clients being provided editing privileges for the shared data record, wherein creating the first revised data record comprises:

consolidating the first update with any unresolved updates to the shared data record submitted by at least one other client of the plurality of clients to create a consolidated update; and applying the consolidated update to the shared data record to create the first revised data record, wherein the unresolved updates to the shared data record are obtained from a common ledger or a client cache, wherein the common ledger stores a log of updates made by each particular client of the plurality of clients to a version of the shared data record accessed by the particular client, wherein the client cache stores a merged view of all updates made to the shared data record by the first client and indication of a current version of the shared data record being accessed by the first client, wherein applying the one or more rules comprises an action selected from a group of actions comprising: determining viability of a requested configuration, calculating pricing, calculating inventory, configuring a product, and determining a quote of a configured product based on a plurality of pricing calculations, and wherein the operations further comprise:

receiving a second change request comprising a third update to the shared data record from a second client;

applying at least the third update to the shared data record to create a third revised data record;

applying the one or more rules to the third revised data record to determine a fourth update that is (a) required at least as a result of applying the third update, and (b) has not been requested by any of the plurality of clients;

determining a second set of differences between a second version of the shared data record accessed by the second client and the fourth revised data record; and sending the second set of differences to the second client.

10. A system, comprising:

one or more hardware processors;

a non-transitory computer readable medium comprising instructions which, when executed by the one or more hardware processors, causes performance of operations comprising:

receiving an update request for a shared data record from a first client, the shared data record being accessible to a plurality of clients including the first client;

applying pending changes to the shared data record to create a first revised data record;

applying one or more rules to the first revised data record to determine a first set of one or more changes that is (a) required at least as a result of applying the pending changes, and (b) has not been requested by any of the plurality of clients;

applying the first set of one or more changes to the first revised data record to create a second revised data record;

determining a set of differences between a first version of the shared data record accessed by the first client and the second revised data record; and sending the second revised data record to the first client.

11. The system as recited in claim 10, wherein the update request comprises a change request from the first client, the change request comprising a second set of one or more changes to the first version of the shared data record.

12. The system as recited in claim 11, wherein creating the first revised data record comprises:

consolidating the second set of one or more changes and any unresolved changes to the shared data record submitted by at least one other client of the plurality of clients to create a set of consolidated changes; and applying the set of consolidated changes to the shared data record to create the first revised data record.

13. The system as recited in claim 12, wherein the unresolved changes to the shared data record are obtained from a common ledger, wherein the common ledger stores a log of changes made by each particular client of the plurality of clients to a version of the shared data record accessed by the particular client.

14. The system as recited in claim 12, wherein the unresolved changes to the shared data record are obtained from a client cache, wherein the client cache stores a merged view of all changes made to the shared data record by the first client and indication of a current version of the shared data record being accessed by the first client.

15. The system as recited in claim 10, wherein applying the one or more rules comprises an action selected from a group of actions consisting of: determining viability of a requested configuration, calculating pricing, calculating inventory, configuring a product, and determining a quote of a configured product based on a plurality of pricing calculations.

16. The system as recited in claim 10, wherein the operations further comprise:

receiving an update request for the shared data record from a second client;

determining a second set of differences between the second revised data record and a second version of the shared data record accessed by the second client; and sending the second set of differences to the second client.

17. The system as recited in claim 10, wherein the shared data record is simultaneously accessed by more than one of the plurality of clients, with each particular client of the plurality of clients being provided editing privileges for the shared data record.

18. The system as recited in claim 10, wherein the operations further comprise:

receiving a request for a third update to the shared data record from a second client;

applying at least the third update to the shared data record to create a third revised data record;

applying the one or more rules to the third revised data record to determine a fourth update that is (a) required at least as a result of applying the third update, and (b) has not been requested by any of the plurality of clients;

determining a second set of differences between a second version of the shared data record accessed by the second client and the fourth revised data record; and sending the second set of differences to the second client.

19. The system as recited in claim 10, wherein creating the first revised data record comprises applying a pending update requested by a second client of the plurality of clients.

20. A method, comprising:

receiving, from a first client, a change request comprising a first update to a shared data record, the shared data record being accessible to a plurality of clients including the first client;

applying at least the first update to the shared data record to create a first revised data record;

applying one or more rules to the first revised data record to determine a second update of the shared data record that (a) is required as a result of applying the first update, and (b) has not been requested by any of the plurality of clients;

applying the second update to the first revised data record to create a second revised data record; and sending the second revised data record to the first client, wherein the method is performed by at least one device including a hardware processor.

21. The medium as recited in claim 1, wherein applying the second update to the shared data record comprises deleting at least one value in the first revised data record, that was a result of the first update, to create the second revised data record.

22. The medium as recited in claim 1, wherein applying the one or more rules to the first revised data record to determine the second update of the shared data record comprises:

detecting one or more errors in the first revised data record; and determining one or more solutions to the one or more errors to include in the second update of the shared data record.

23. The medium as recited in claim 1, wherein applying the one or more rules to the first revised data record to determine the second update of the shared data record comprises:

detecting that the first revised data record does not adhere to a particular set of rules; and determining the second update such that the second revised data record, resulting from applying the second update, adheres to the particular set of rules.

24. The medium as recited in claim 1, wherein the shared data record is simultaneously being accessed by the first client and the second client when the change request is received.

25. The medium as recited in claim 1, wherein the plurality of clients further includes a second client and wherein the operations further comprise sending the second revised data record to the second client.

\* \* \* \* \*